US008175087B2

(12) United States Patent
Jadus

(10) Patent No.: US 8,175,087 B2
(45) Date of Patent: May 8, 2012

(54) METHOD AND SYSTEM FOR COMMUNICATING MULTIPLE DATA SIGNALS OVER A SINGLE UNIDIRECTIONAL ISOLATION COMPONENT

(75) Inventor: Brian Kirk Jadus, Williston, VT (US)

(73) Assignee: Linear Technology Corporation, Milpitas, CA (US)

( * ) Notice: Subject to any disclaimer, the term of this patent is extended or adjusted under 35 U.S.C. 154(b) by 318 days.

(21) Appl. No.: 12/577,358

(22) Filed: Oct. 12, 2009

(65) Prior Publication Data

US 2011/0085438 A1 Apr. 14, 2011

(51) Int. Cl.
*H04L 12/50* (2006.01)
(52) U.S. Cl. ......................................... 370/366; 370/535
(58) Field of Classification Search .................. 370/366, 370/503, 535, 365, 412
See application file for complete search history.

(56) References Cited

U.S. PATENT DOCUMENTS

| 5,426,643 | A  | * | 6/1995 | Smolinske et al. | 370/506 |
| 6,862,324 | B1 | * | 3/2005 | Lui et al. | 375/326 |
| 7,747,426 | B2 | * | 6/2010 | Nakamura et al. | 703/19 |
| 2003/0099230 | A1 | * | 5/2003 | Wenk | 370/366 |
| 2007/0002870 | A1 | * | 1/2007 | Pekonen et al. | 370/395.42 |
| 2007/0002895 | A1 | * | 1/2007 | Chan | 370/467 |

\* cited by examiner

*Primary Examiner* — Ricky Ngo
*Assistant Examiner* — Kan Yuen
(74) *Attorney, Agent, or Firm* — McDermott Will & Emery LLP

(57) ABSTRACT

Method and system for serially sending data signals captured from multiple sources through a single unidirectional isolation component. Data signals from respective multiple sources are captured in parallel. Such captured data signals are stored in respective storages. The stored data signals are transferred, in serial, from the storages to a single unidirectional isolation component. Multiple concurrent processes for parallel data signal capture and serial data signal transfer via a single unidirectional isolation component are implemented so that the sampling effect on a first of the multiple processes is minimized.

30 Claims, 17 Drawing Sheets

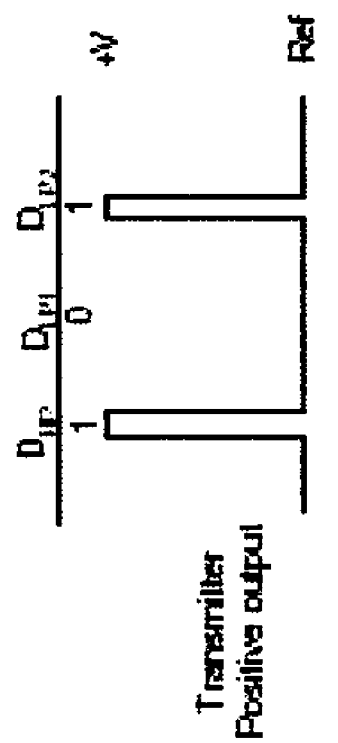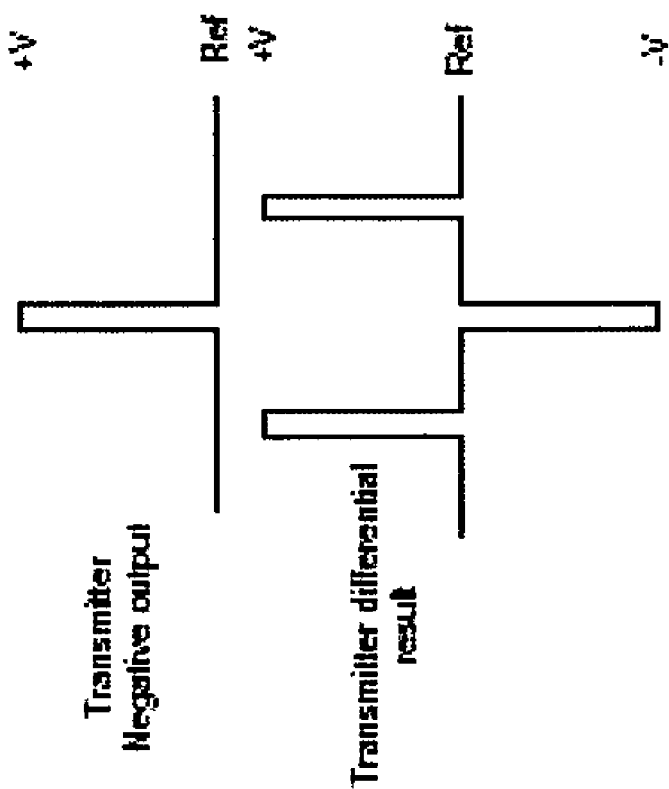
Fig. 11(a)
Fig. 11(b)
Fig. 11(c)

METHOD AND SYSTEM FOR COMMUNICATING MULTIPLE DATA SIGNALS OVER A SINGLE UNIDIRECTIONAL ISOLATION COMPONENT

BACKGROUND

1. Technical Field

The present teaching relates generally to methods and systems for communications. More specifically, the present teaching relates to methods and systems for communicating multiple data signals and systems incorporating the same.

2. Discussion of Technical Background

In modern communications, data signals that are to be communicated frequently have to be sampled and such sampled data signals are then transmitted. Particularly, when there are multiple data signal inputs, to transmit such multiple data signals, a conventional approach is to employ multiple isolation components to isolate each data signal prior to transmitting each data signal. Isolated communications are commonly implemented based on passive components, active (e.g., opto-couplers), or passive-active (GMR) in which galvanic isolation can be supported.

Traditionally, communication protocols for such physical implementations falls within two categories. In one category, multiple signals are serialized so that multiple signals can be communicated over a single isolation component. In this category, a single fixed clock is used for both sampling and transmission at a fixed refresh rate. One example circuit of this category is provided in FIG. 1 (PRIOR ART). With such a circuit, signal processing and sampling create systematic jitter and therefore it is not desirable.

Another category of prior solutions is to have each signal transmitted over a separate isolation component. With such solutions, to transmit multiple data signals, multiple isolation components have to be deployed. Multiple isolation components increase both the physical area needed and the isolation barrier capacitance. A typical circuit of this type of solution is illustrated in FIG. 2 (PRIOR ART). With this prior art solution, the clock used is event driven. An event can be when an edge of an input signal is detected. Such an event will activate an event driven timer, as shown in FIG. 2, and the activated clock will be used to sample and transmit data signals.

One problem with this solution is that, even when a single signal is to be transmitted, transmitting a refresh signal causes jitter when a single isolation component is used so that an additional isolation component is needed for transmitting the refresh signal, leading to the same problem of the increased physical space as well as isolation barrier capacitance.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 depicts exemplary signals transmitted from the circuit described herein, according to an embodiment of the present teaching;

DETAILED DESCRIPTION

The present teaching relates to communicating multiple data signals over a single unidirectional isolation component. Specifically, the present teaching discloses method and system to sample multiple data signals in parallel and serially transmit such sampled signals using a single isolation component. This invention communicates multiple signals over a single isolation component reducing physical area. This invention uses events to process each signal change and handles the high priority signal separately. On a single event, all input signals associated with the event are sampled and transmitted as a packet of data. When there are events of different priority, an event with a lower priority yields to a higher priority event. An event driven timer allows the high priority event to be processed with a fixed propagation delay.

The key features that enable multiple signals to be transmitted over a single isolation component along with a systematic jitter free signal include a parallel capture with an M deep bank of registers and multiplexer to shift M signals in series to a transmitter. In addition, there are separate concurrent processes for events of different priorities. Specifically, an exemplary embodiment with high and low priority events are discussed. Furthermore, an event driven timer enables a systematic jitter free communication of a single signal. With the present teaching, refresh and low priority signals do not cause jitter to the high priority signal because a higher priority event pre-empts low priority signals to maintain a jitter free operation.

Figure 1:
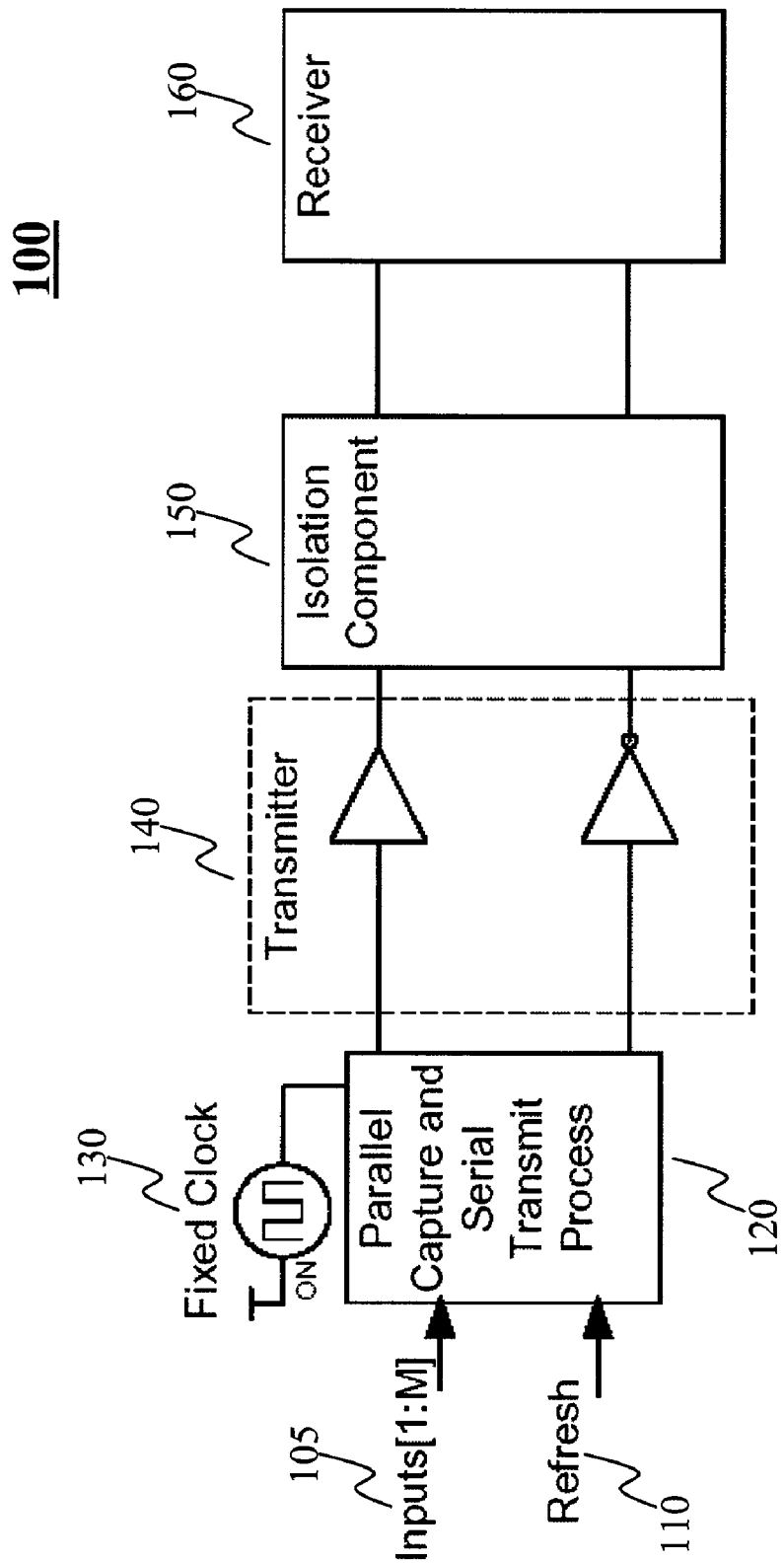
FIGS. 1-2 (PRIOR ART) depict different prior art solutions for sampling multiple data signals and transmitting the signals via isolation components.
Figure 2:
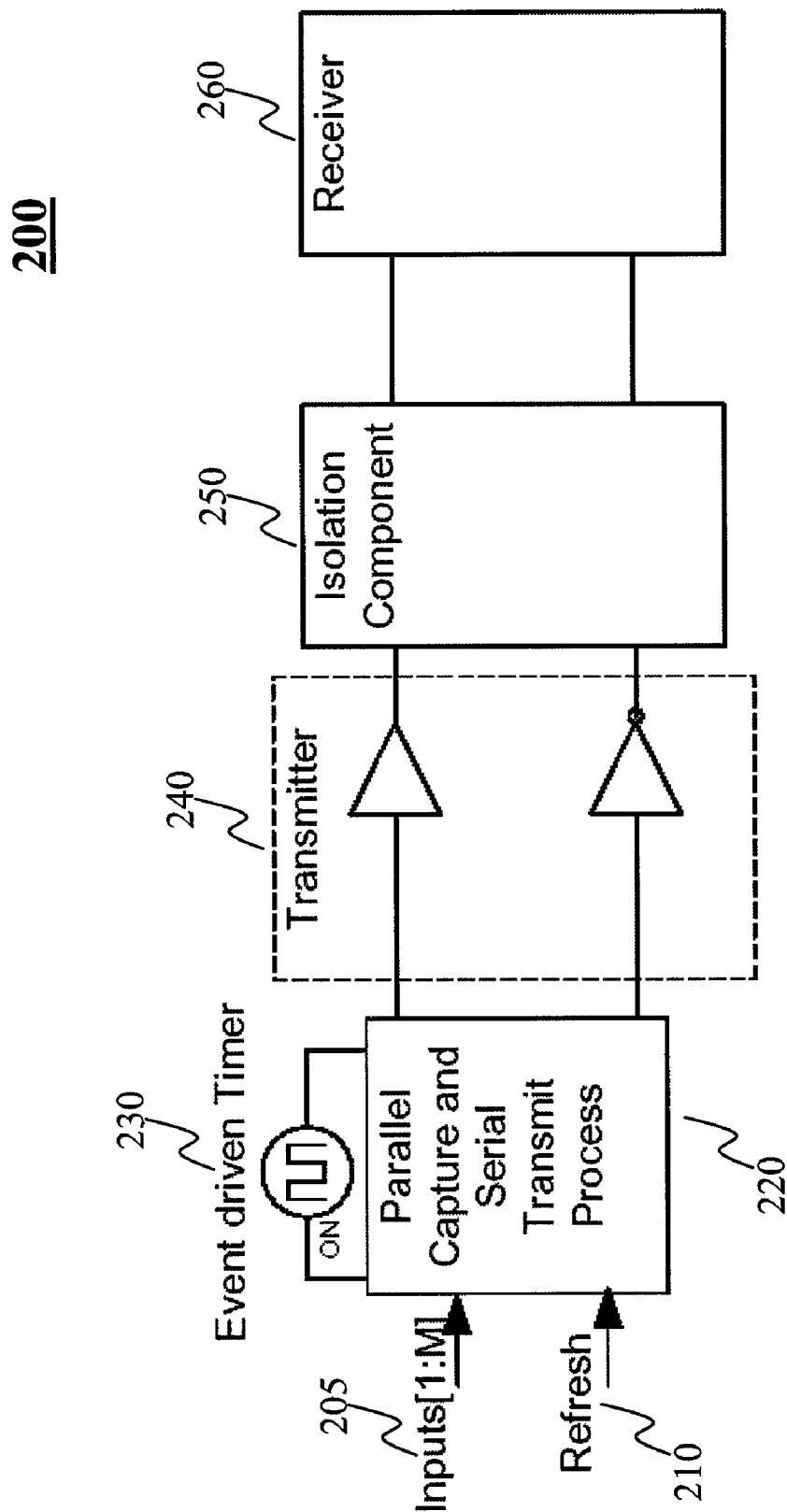
Figure 3:
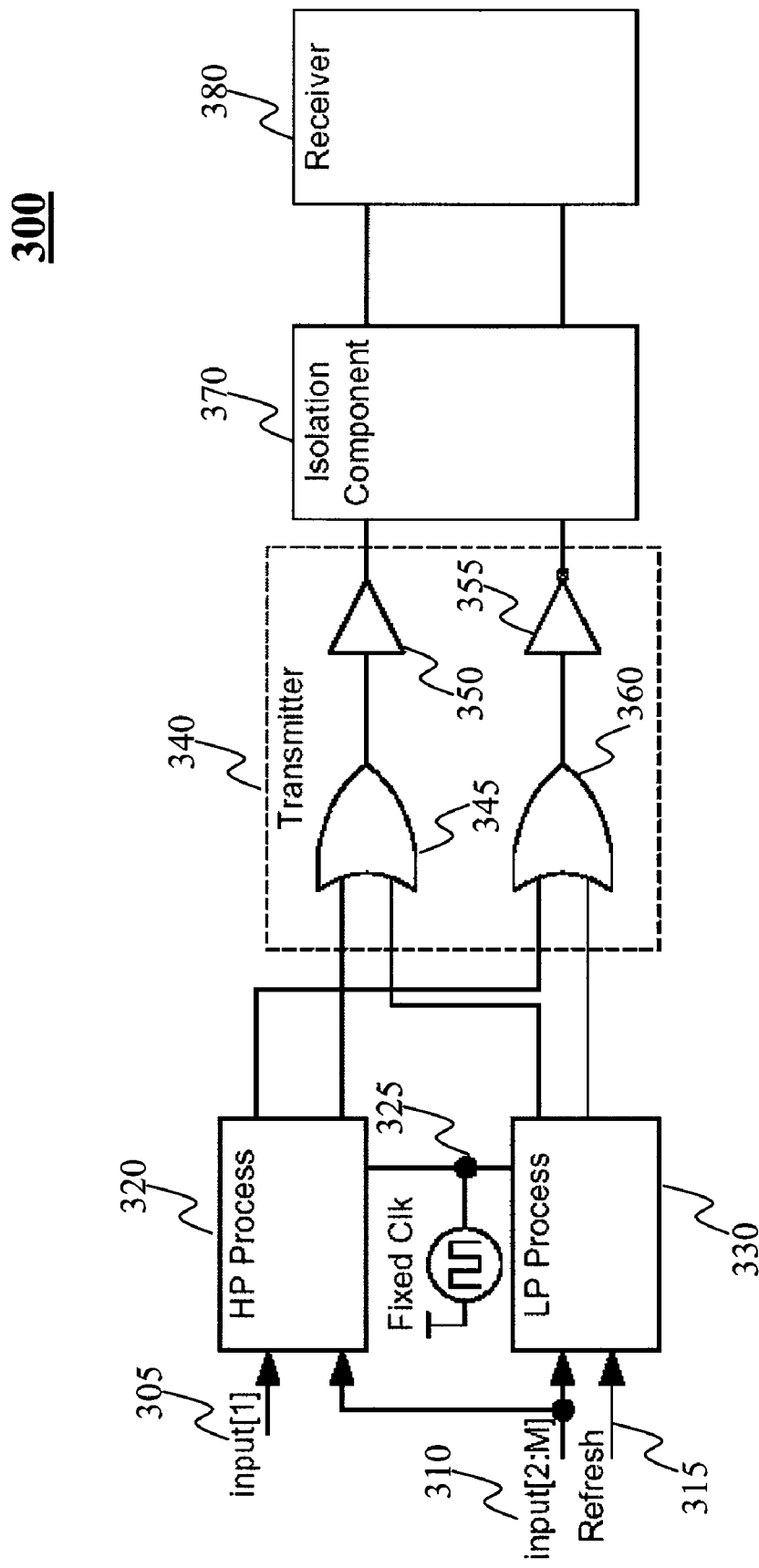
FIGS. 3-5 depict different embodiments of proposed solutions for parallel multiple input signal capturing and serial transmission using a single isolation component, according the different embodiments of the present teaching.

FIG. 3 depicts an exemplary construction of a system 300 for parallel multiple input signal capturing and serial transmission of such input signals based on a single isolation component, according to an embodiment of the present teaching. The system 300, as illustrated in FIG. 3, comprises a high priority (HP) process 320 and a low priority (LP) process 330. A high priority (HP) signal is defined as a low jitter or jitter free high priority signal. A low priority (LP) signal is defined as a low priority signal that may contain systematic jitter.

Both processes are clocked using a fixed clock 325. The input signals, whether signal 305 of the HP process 320 or signals 310 of the LP process 330, are captured in parallel and transmitted, via a transmitter 340, in serial to a single isolation component 370. The transmitter 340 in FIG. 3 may further comprise additional components such as OR gates 345 and 360 and inverters 350 and 355. The transmitter 340 drives the isolation component 370 from the signals generated with the fixed clock 325 based HP or LP process blocks. The data is received by a receiver 380 across the isolation component in serial.

When an edge of an input signal is detected, the detection initiates a process clocked by the fixed frequency clock 325. If the input signal is an LP signal, an LP process 330 is initiated. If the input signal is an HP process, an HP process 320 is initiated. The fixed frequency clock 325 is used for both sampling and transmitting signals for LP and HP signals. The circuit in FIG. 3 is also capable of ensuring that the HP process 320 is free of jitter. This is achieved by pre-empting the LP process 330 when the HP process 320 is detected. If an HP process is detected after LP input signals are captured, the further capture of the LP input signals may be pre-empted. However, the LP input signals that have been captured previously may be ORed with the input signals from the HP process and transmitted via the single isolation component 370. The system 300 may produce sampling jitter on all signals. It may also produce processing jitter on LP signals. However, there is no processing jitter on HP signals and there is also no jitter introduced due to a refresh event.

Figure 4:
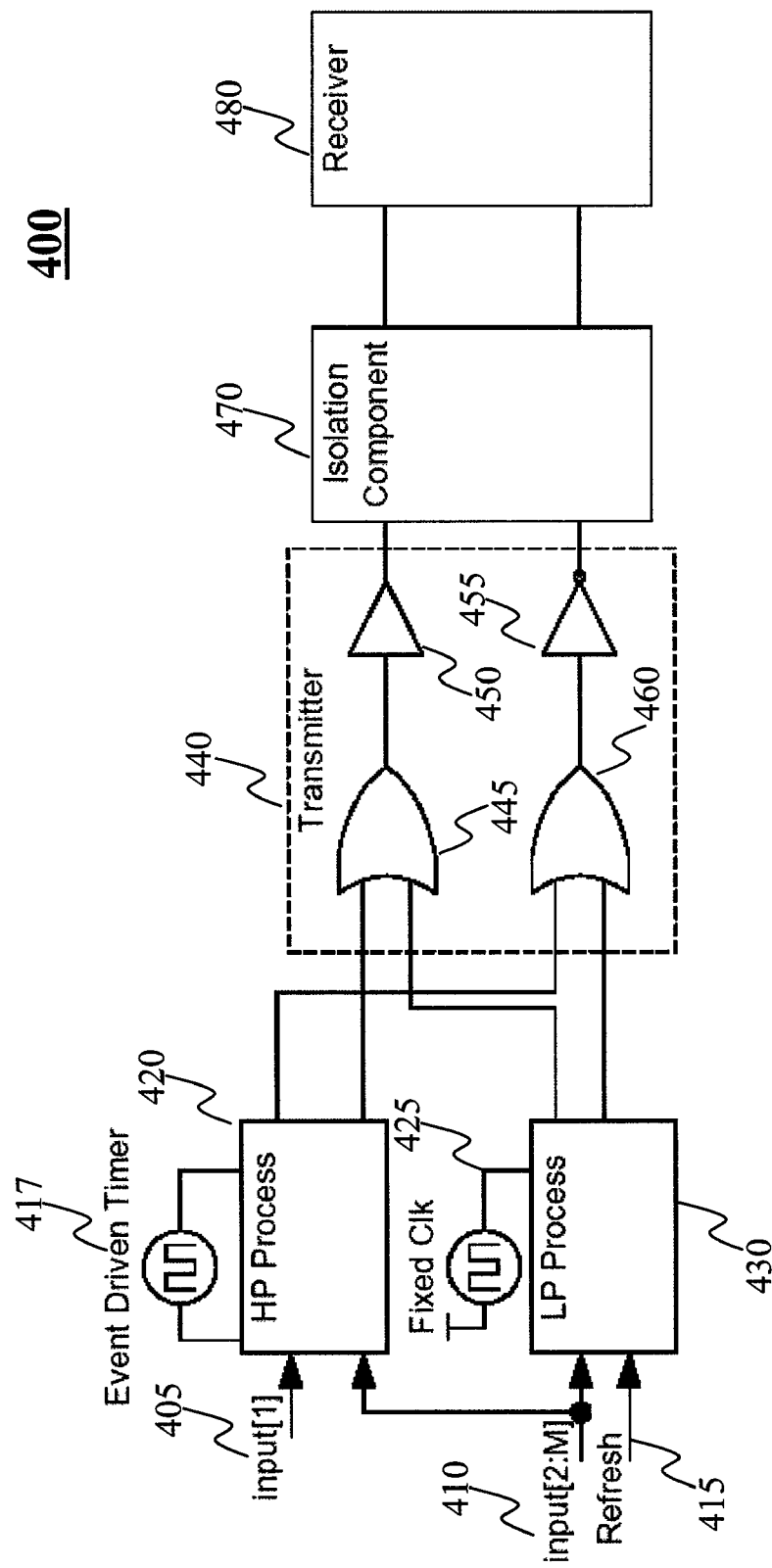
Figure 5:
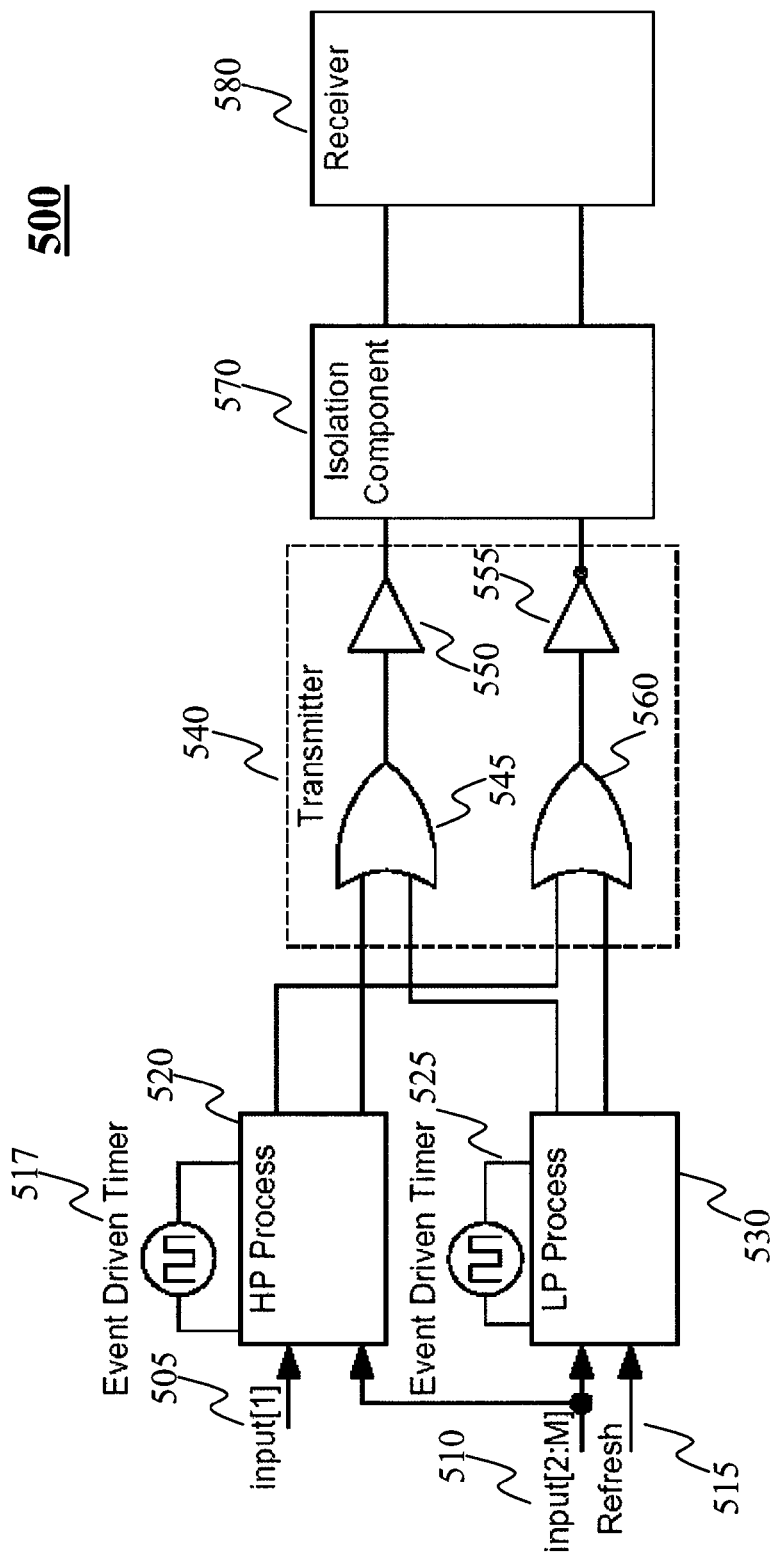

Other implementation embodiments of the present teaching are shown in FIGS. 4-5. The exemplary system 400 shown in FIG. 4 also comprises both an LP process 430 and an HP process 420 with pre-emption capability. However, the HP process 420 in FIG. 4 utilizes an event driven timer 417 which is activated when a change on the HP signal is detected (an event). In the meantime, the LP process 430 uses a fixed clock 425 in a similar manner as system 300 in FIG. 3. Because of the use of the event driven timer 417, the system 400 has no sampling jitter on HP signals. But there is still a jitter for both sampling and processing on LP signals. Similar to system 300, system 400 presents no jitter introduced by a refresh event.

FIG. 5 depicts another different exemplary system 500, in which both the LP and HP processes 520 and 530 utilize event driven timers 517 and 525 so that the clocks will not start until there is an event detected in respective processes. Therefore, there is no sampling jitter on either HP or LP process 520 and 530. However, there may be some processing jitter on LP signals. Similar to system 300 and system 400 there is no jitter introduced by a refresh event.

Figure 6:
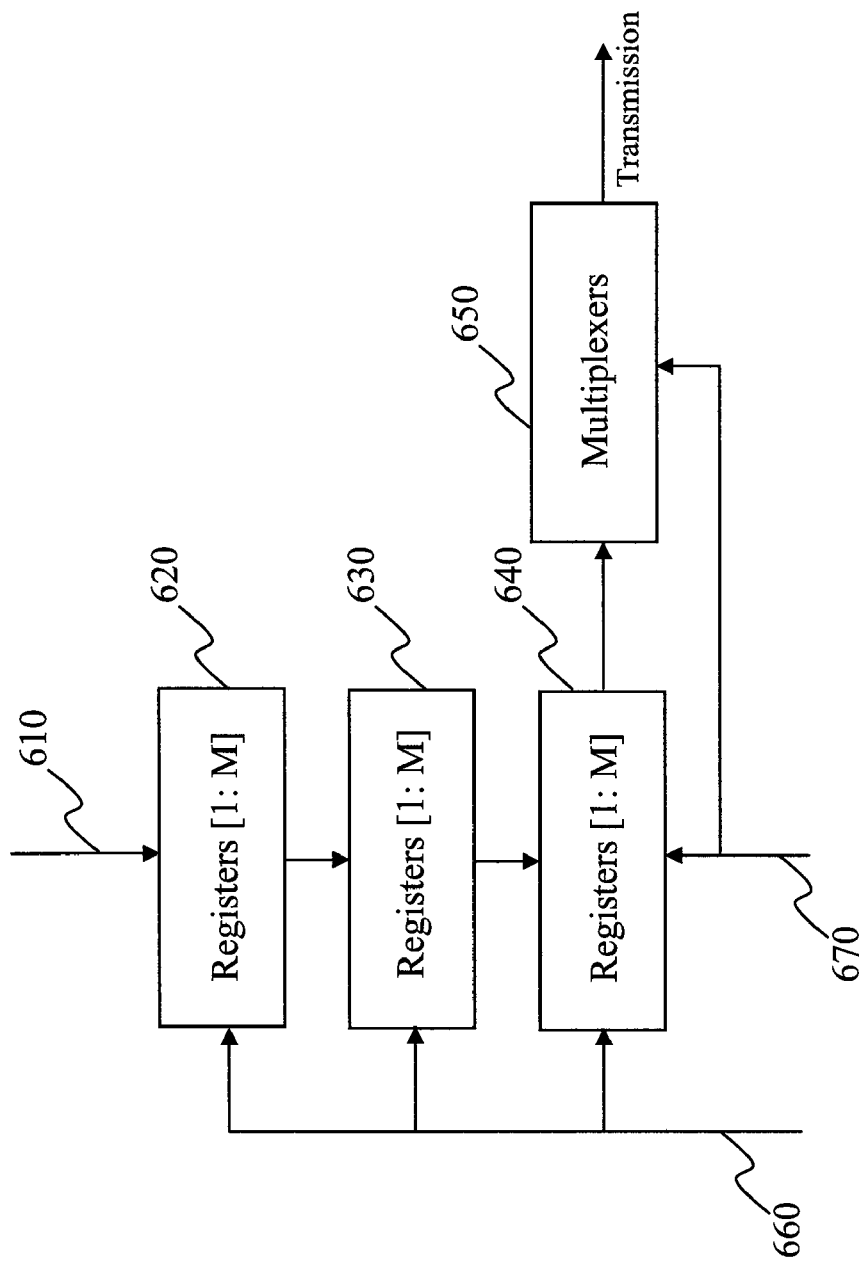
FIG. 6 shows an exemplary structure of a plurality of registers and multiplexer to facilitate storage of sampled multiple signals, according to an embodiment of the present teaching.

FIG. 6 shows exemplary construct 600 having a plurality of input registers 620, 630, and 640, facilitating parallel multiple data signal capture and multiplexers 650 used to serialize the sampled data signals for serial transmission, according to an embodiment of the present teaching. The exemplary construct 600 has three parallel registers, each of which is M deep. The depth of each register, M, equals the number of input signals. Each of the parallel registers (620, 630, and 640) is clocked M times.

Various logical functions such as glitch filtering may be implemented within the input registers so that input signals captured therein may be processed during the M clock cycles. Once the capture phase is completed, the clock starts to run the transfer phase of the process that serializes the data signals to the transmitter. In some embodiments, multiplexing may be adopted to implement such a serialization process. As shown in FIG. 6, multiplexers 650 connected to the final register bank 640 convert the content stored in the registers from parallel input signals to a serial input signal during the transition from the capture phase to a transmit phase.

Figure 7:
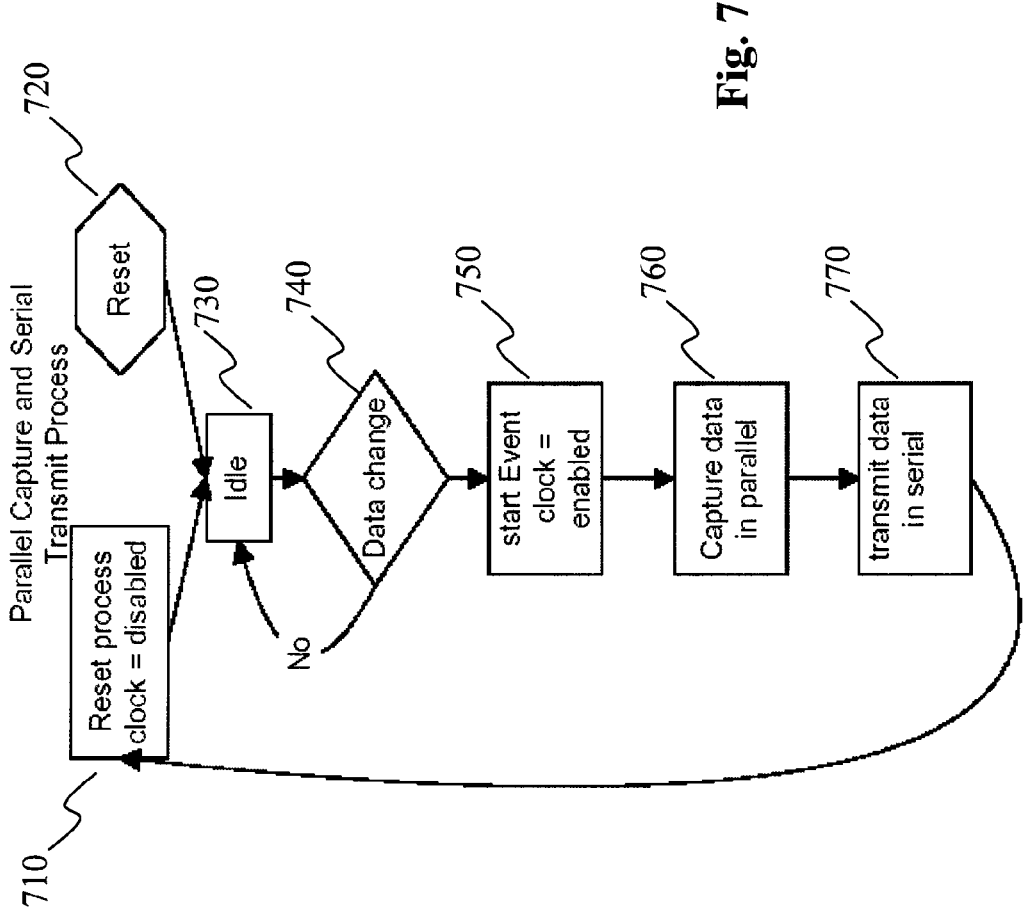
FIG. 7 is a flowchart of an exemplary process for multiple input sampling in parallel and transmission in a serial manner, according to an embodiment of the present teaching.

FIG. 7 is a flowchart of an exemplary process for parallel multiple input signal capture and serial input signal transmission, according to an embodiment of the present teaching. The flow as shown in FIG. 7 represents an exemplary basic process for such an operation. This illustrated process employs an event driven clock, which is initially set (at 720) or reset (at 710) to disabled. The disabled clock remains idle (at 730) until a change in the input signal is detected at 740. The detected change triggers an event, which starts the process and enables a clock, at 750, to run through different states in time. Examples of such states include a capture state at 760 and a transmission state at 770.

Figure 8:
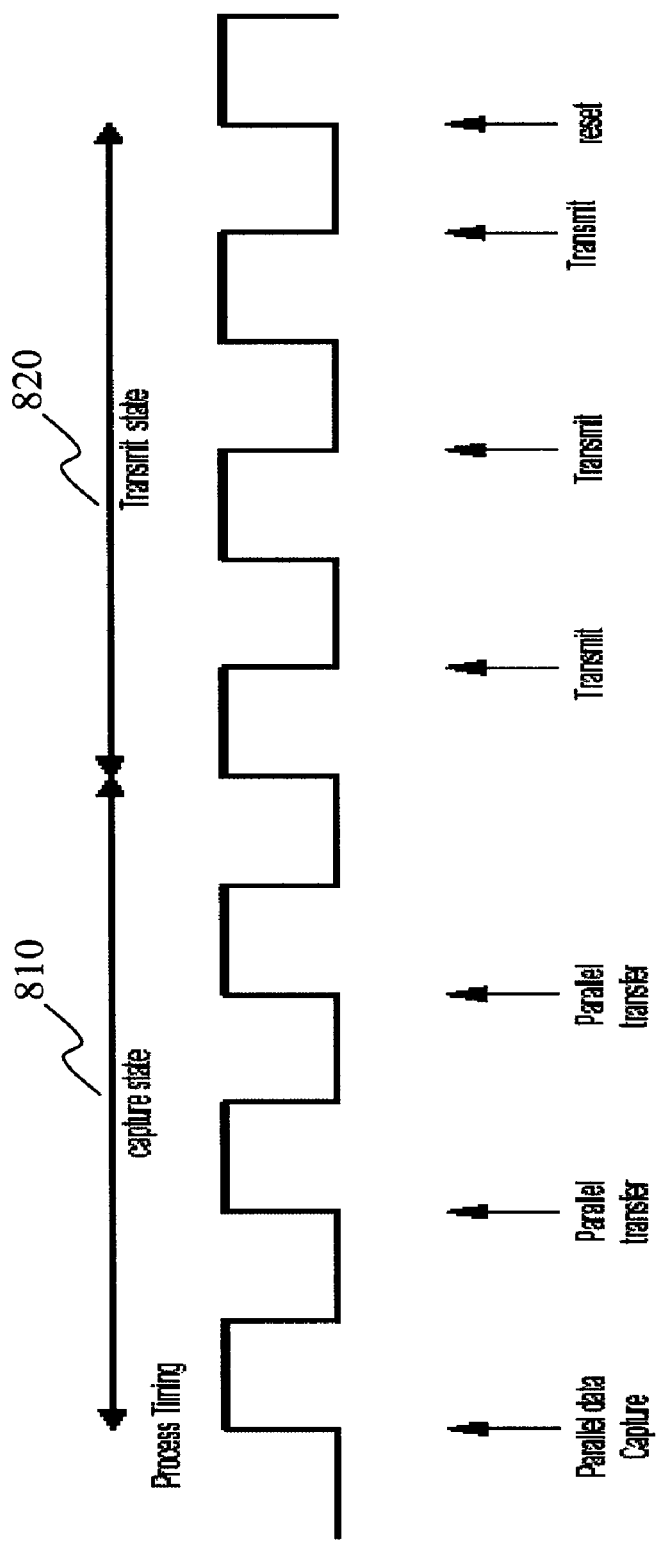
FIG. 8 depicts the timing diagram of multiple signal sampling and transmission, according to an embodiment of the present teaching.

In operation, each of the capture and transmit state in the illustrated process may be clocked M times. This is shown in FIG. 8, which depicts the timing diagram of multiple signal sampling and transmission, according to an embodiment of the present teaching. Specifically, a timing diagram with M=3 is shown in FIG. 8, which comprises two states. One is a capture state 810, in which the rising edges of consecutive three clock cycles are used for triggering capture. Specifically, the first rising edge triggers parallel data capture of all three input signals. Such captured input signals are stored in separate input registers. Subsequently, the rising edges of the next two consecutive rising edges of the clock within the capture state trigger data transfer from the input registers to the serializing registers or transmitter (see FIG. 6).

Following the capture state is a transmit state 820, which comprises three clock cycles. In the transmit state 820, three clock edges, e.g., falling edges as illustrated in FIG. 8, are used to clock the transmission of the input signals. Thus, in this exemplary embodiment, input signals are advanced into input registers on the rising edges of the clock signals in the capture state and such signals are then transmitted on the falling edges of the clock signals in the transmit state. This provides adequate time lag between the capture state and transmit state to ensure quality.

Capturing multiple input signals and processing such captured input signals in a single process may yield jitter. To eliminate jitter, concurrent processing utilizing event driven timers may be employed to ensure that high priority signals can be transmitted free of jitter with multiple additional inputs. For example, an event driven timer can be used to make sure that input signals can be sampled with a consistent propagation delay.

Figure 9:
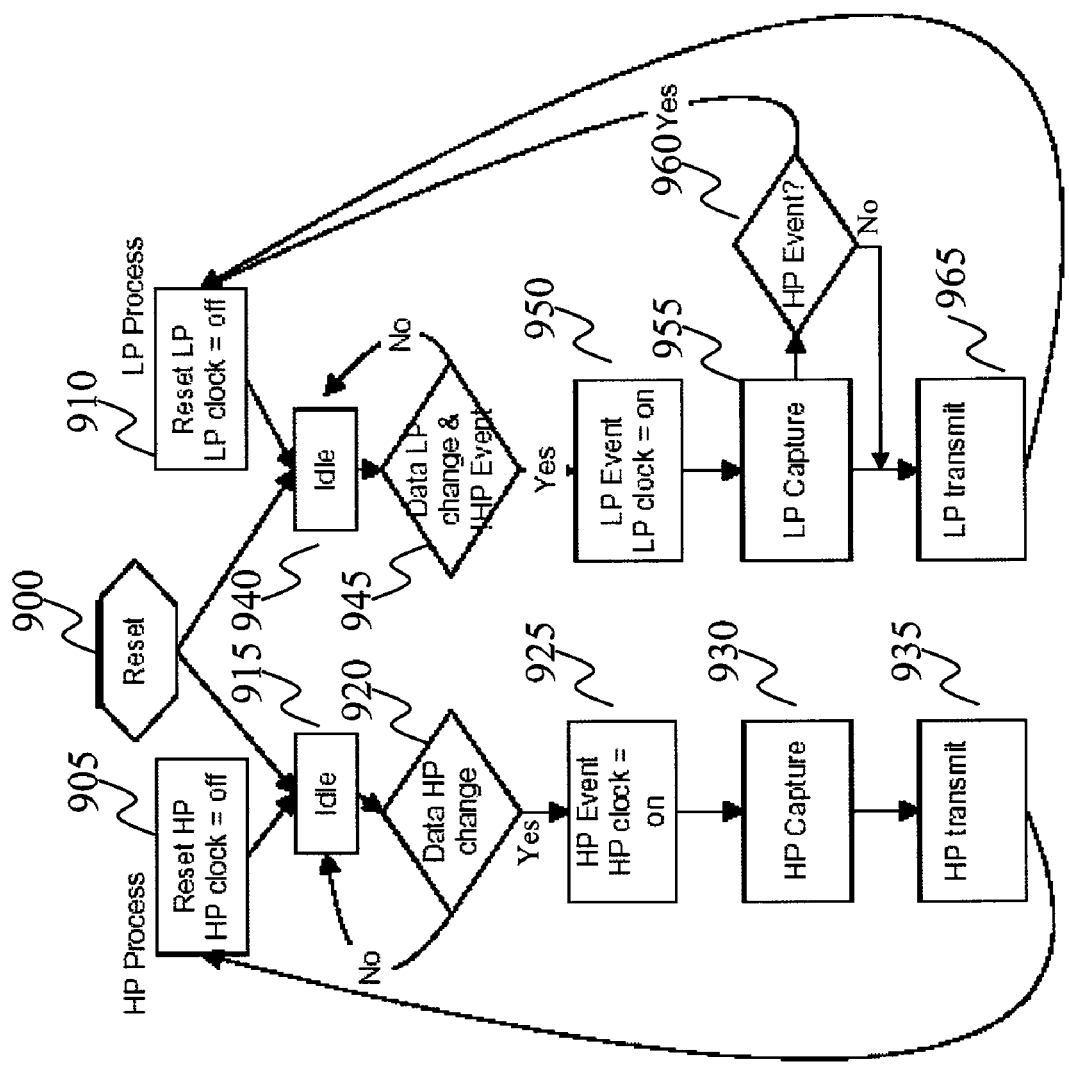
FIG. 9 is a flowchart of an exemplary process for multiple parallel input sampling and serial transmission with high and low priority channels, according to an embodiment of the present teaching.

FIG. 9 is a flowchart of exemplary concurrent processes for parallel multiple input signal capture and serial transmission with high and low priority channels, according to an embodiment of the present teaching. In the illustrated exemplary process flow, both LP and HP clocks are set off, at 900. The HP process remains idle, at 915, until a change in the HP signal is detected at 920 and enables an HP event driven timer which starts an HP clock at 925. Once the HP process is started, HP input signals are captured at 930 and transmitted at 935. Once the input signals are transmitted, the HP process resets the HP clock, at 905, to the off state.

Similarly, the LP process remains idle, at 940, until a change in the HP signal is detected at 945 and enables an LP event driven timer which starts an LP clock at 950. Once the LP process is started, LP input signals are captured at 955. If there is no HP event detected, determined at 960, the LP process transmits, at 965, the captured LP input signals. If an HP event is detected at 960, the detected HP event pre-empts the LP process and the LP clock is reset to be off at 910. As illustrated, each of the HP and LP processes may separately use a fixed clock once it is enabled.

Once either one of the HP or LP processes is started, the respectively enabled clock runs through a process by clocking different states and operations. For example, clock cycles within a capture state enable multiple input signals to be captured in parallel and transferred. The clock also cycles within a transmit state to serially transmit the captured input signals on the clock edges (as described herein). When the transmission state is completed, the process is then reset and the clock in a corresponding HP or LP process is disabled until the next event is detected.

As depicted herein, the HP process takes precedence over an LP process in order to maintain a consistent propagation delay. The HP capture operation may be clocked for a sufficient amount of time so that the transmission in the LP process can be completed before the transmission in the HP process can be started. On the other hand, the LP capture operation may be clocked for a sufficient amount of time so that the transmission in the HP process can be completed before the transmission in the LP process can be started. This allows an existing transmission stream to be completed without being interrupted and, hence, introduces a consistent propagation delay. In the depicted concurrent process flow in FIG. 9, the LP process may be pre-empted when an HP event is detected so that the HP signals are free of systematic jitter with the use of an event driven timer.

Figure 10:
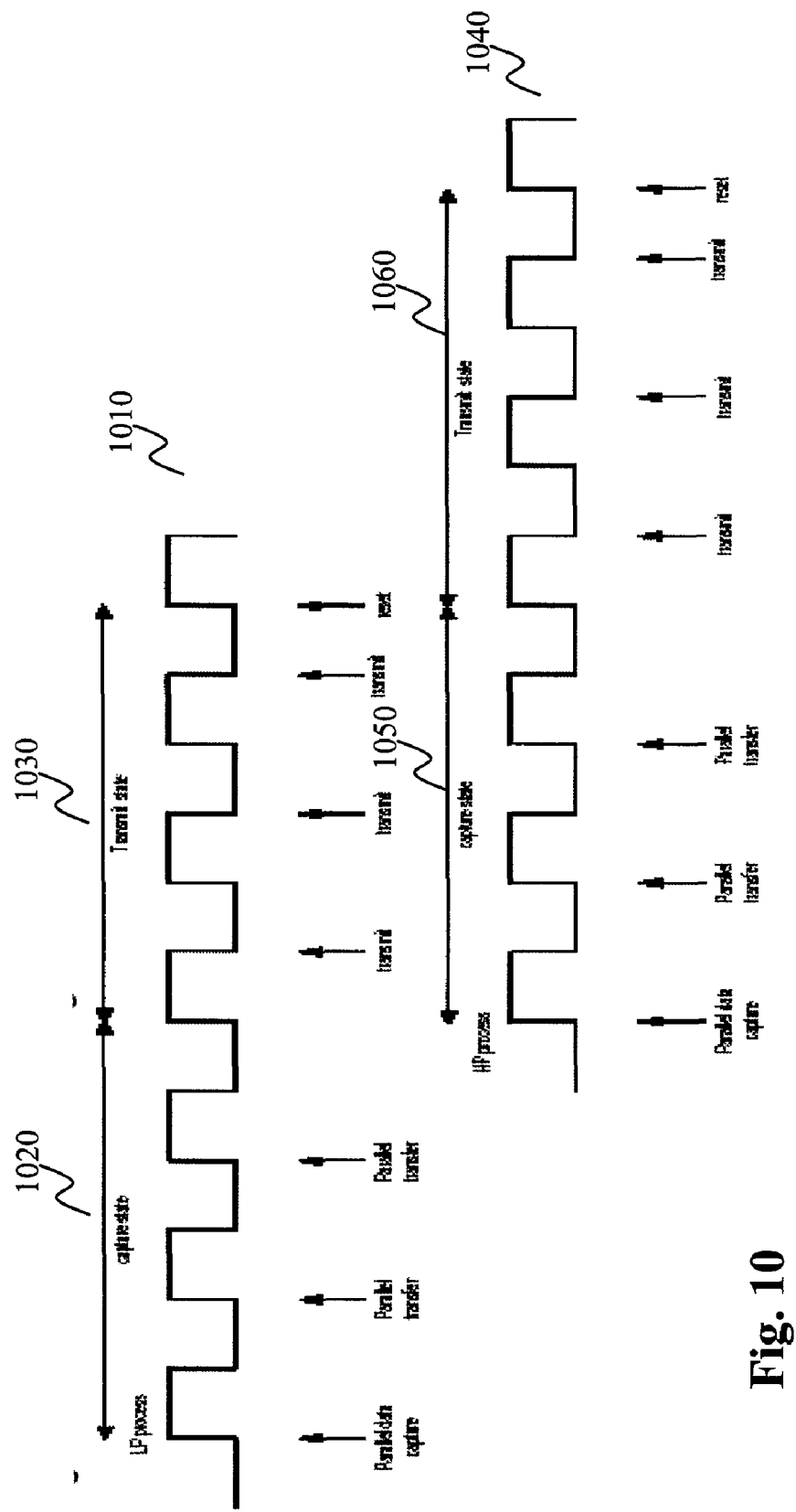
FIG. 10 depicts a timing diagram of concurrent processes of high and low priority channels for parallel signal sampling and serial transmission, according to an embodiment of the present teaching.

FIG. 10 depicts an exemplary relationship between two timing diagrams for concurrent HP and LP processes with parallel signal capturing and serial transmission, according to an embodiment of the present teaching. It shows HP and LP processes 1010 and 1040. These two processes can run concurrently without a collision under the operational scheme of the present teaching. Similar to the analysis for the single timing diagram illustrated in FIG. 8, an example is provided in FIG. 10 where a timing diagram with M=3 for each process (LP or HP) is illustrated. In FIG. 10, each process has capture and transmission states. For example, the LP process 1010 has a capture state 1020 and a transmission state 1030. In the capture state, parallel input signal capture is performed at the rising edge of the first clock cycle and such captured input signals are transferred at the rising edges of the two subsequent clock cycles. In the transmission state 1030, input signals are transmitted at the falling edges of each of the three (M) clock cycles. The HP process 1040 is similarly constructed. That is, high priority input signals are captured in parallel at the rising edge of the first clock cycle of the capture state 1050 and transferred at the rising edges of the remaining two clock cycles. Upon entering into the transmission state 1060, high priority input signals are transmitted at the falling edges of the M clock cycles.

In the illustrated timing diagrams, the two processes proceed with capturing and transmission states without a collision. If the HP process 1040 slides to the right in time, that will create a collision situation. If that occurs, the HP event will pre-empt the LP process 1010 so that the capturing operation of the pre-empted LP process 1010 is interrupted and the low priority input signals are to be transmitted, e.g., in an recaptured manner, with the HP process. Since the start of processing of the low priority input signals is recaptured with the high priority data signal transmission, there is no jitter on the HP signals. However, this may cause jitter on the LP signals.

FIG. 11 depicts an exemplary way of transmitting input signals. Signals may be transmitted in the form of differential pulses with one pulse per input signal. As illustrated, a digital one (1) is driven as a positive pulse and a digital zero (0) is driven as a negative pulse. Using one pulse for each signal, a clock may be encoded into the signal. When such signal is received by the receiver (e.g., receivers 380, 480, or 580), it can be decoded to recover the original input signal in a manner that is synchronous with the transmitted signal.

In accordance with the present teaching, a single isolation component can be used for signals from multiple processes of input signal capturing and transmission. In some embodiments, such a configuration may be duplicated, i.e., multiple isolation components can be incorporated in which each isolation component may be designated to handle one high priority signal process and one or more additional low priority signals or events. In addition, since a refresh of the isolation barrier is considered to be a low priority event it can, therefore, be implemented in accordance with the present teaching so that no jitter will be introduced to the high priority signal.

Figure 12A:
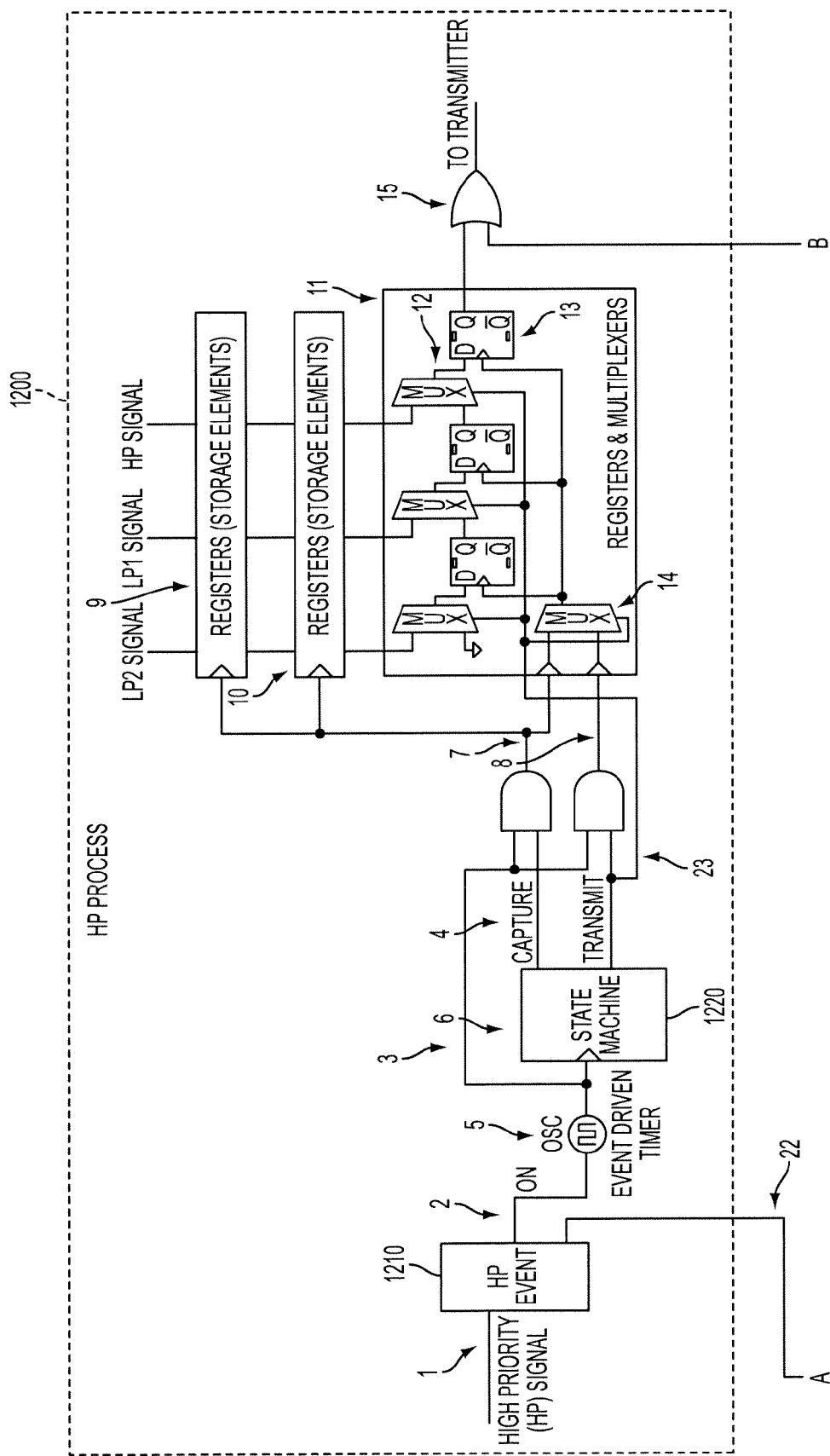
FIGS. 12(a) and 12(b) depict an exemplary circuit to facilitate concurrent processes of high and low priority channels for parallel multiple signal sampling and serial transmission, according to an embodiment of the present teaching.
Figure 12B:
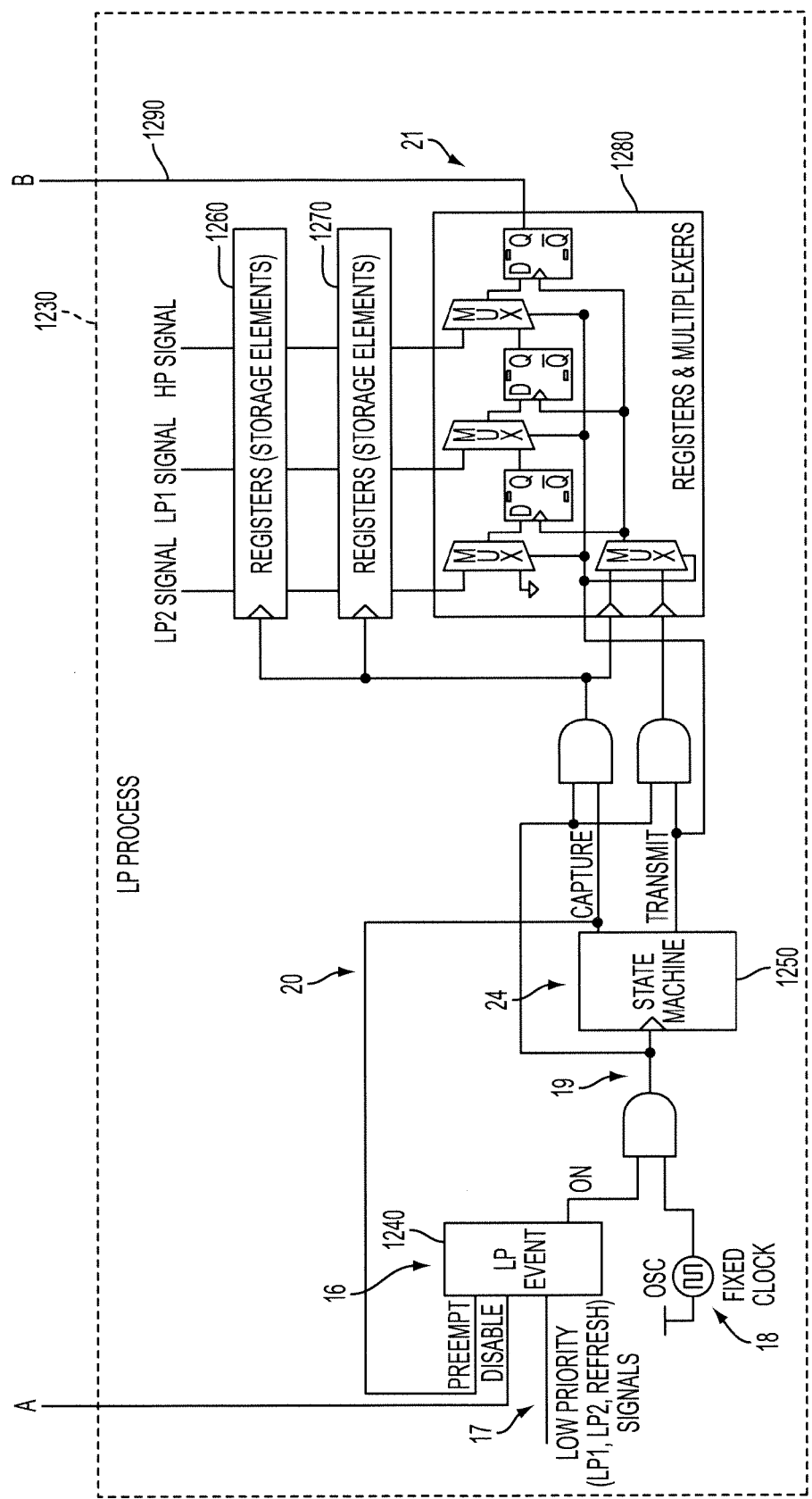

FIGS. 12(a) and 12(b) together depict an exemplary circuit to facilitate concurrent processes of LP and HP channels for parallel multiple signal sampling and serial transmission, according to an embodiment of the present teaching. The exemplary circuit has separate circuits for handling the HP process (shown in FIG. 12(a)) and LP process (shown in FIG. 12(b)). In FIG. 12(a), the circuit 1200 for handling the HP process comprises a plurality of sub-circuits, including an HP event detector 1210, a state machine 1220, a plurality of input registers (9, 10, some in 11) and multiplexers (in 11), and various other components, as shown in FIG. 12(a), to facilitate interactions among those sub-circuits. In FIG. 12(b), the circuit 1230 for handling the LP process comprises different sub-circuits, including an LP event detector 1240, a state machine 1250, a plurality of input registers (in 1260, 1270, and some in 1280) and multiplexers in 1280), and various other components to facilitate interactions among those sub-circuits.

When an HP event is detected by the HP event detector 1210, an event driven timer 5 is activated to produce event driven clock signals 3. The clock signals also trigger the state machine 1220 so that it generates signals, as its output, to control the capture state and the transmission state of the HP process. This event driven clock will advance the states of the state machine 1220, which will advance to capture and transmit states in accordance with, e.g., the number of clocks cycles counted. As discussed herein, the capture state has M clock cycles and input signals of the HP process are captured at the rising edge of the first clock cycle of the capture state. During the capture state, the state machine 1220 generates a high signal on the capture control signal 4 and keeps the transmission control signal 23 low. When the capture control signal and the clock signal 3 are both high, an AND gate which take these inputs produces signal 7, whose rising edge is used to drive the registers in 9 and 10 to capture input signals in parallel. In a similar manner, the subsequent signals on 7 drive the registers to transfer, e.g., on the rising edges of the clock 7, the captured input signals to registers of the next stage. After M clock cycles, the state machine 1220 changes the capture state to the transmission state. That makes the capture control signal 4 low and the transmission control signal 23 high.

In the HP process, once the capture phase is complete, the sampled input signal is stored in storage elements such as a D flip flop (13). The direction of the multiplexer (14) is controlled by the transmit signal (23). A logic "0" on transmit signal (23) is an indication of maintaining the capture phase, during which input signals are stored in parallel in the input registers. A logic "1" on transmit signal (23) signifies a transmit phase, which changes the direction of the multiplexer (14) to serialize the input signal so that input signals stored in the input registers are shifted out of block (11), one at a time, and to the transmitter through the OR gate (15).

Input registers (9, 10, and 11) are used to maintain meta-stability and to allow a sufficient time for the transmission of a current packet being completed without the interruption from other processes, hence, alleviating contention on the transmitter. The LP process functions substantially the same way as the HP process except that a fixed clock (18) is used and that the LP process can be pre-empted by an HP event. As discussed herein, circuits using an event driven clock for the LP process can also be implemented.

As seen in FIG. 12(b), the LP process transmits data via sub-circuit 1280 and the data to be transmitted is sent out as signal B (labeled as 1290). This signal 1290 is connected to the input of the OR gate 15. In this manner, when there is no collision, both the HP and LP processes transmit data via OR gate 15 and at any time, the output of the OR gate 15 is from either the LP process or the HP process but not both.

To facilitate pre-empt operations when LP and HP processes collide, additional control and interaction between the HP and LP processes are implemented. The pre-emption operation is discussed below. When an HP event is detected, the HP event detector 1210 in FIG. 12(a) sends signal 22 (marked as A in FIG. 12(a)) to the LP event detector 1240 in FIG. 12(b) (where the same mark A is found). This will disable the LP event detector so that no LP event will be detected even when there is such an event. In addition, upon receiving the signal 22, the HP event detector 1240 generates a pre-emption control signal 20 which is pinned directly on the capture control signal of the LP process to stop the capture state. However, the pre-emption control signal 20 is not pinned on the transmission control signal of the LP process (which can be seen in FIG. 12(b)) so that the transmission of the LP data will continue. That is, the LP data that are currently in the input registers of the LP process will still be transmitted but there is no new LP data coming into the LP process. As discussed before, transmission of LP data is via output 1290 (or B) through the OR gate 15 (FIG. 12(a)).

Figure 13A:
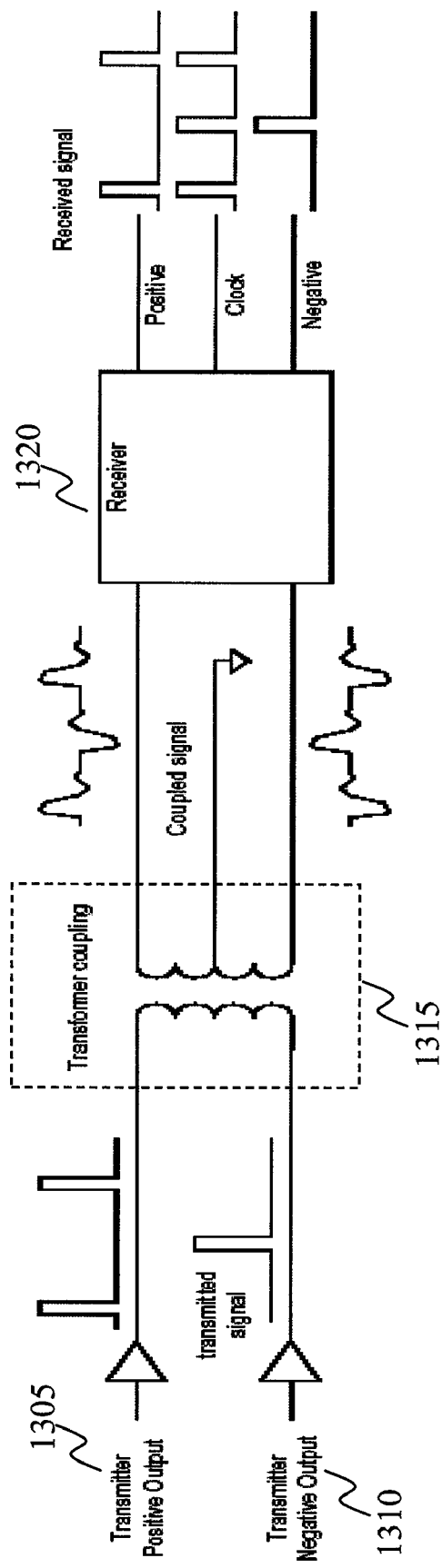
FIGS. 13(a)-13(d) depict exemplary implementations of an isolation component in the context of parallel multiple signal sampling and serial transmission, according to an embodiment of the present teaching.

FIGS. 13(a)-13(d) depict exemplary implementations of an isolation component. FIG. 13(a) illustrates an exemplary implementation of an isolation component based on transformer coupling 1315. At the inputs on the left of the circuit, the top input terminal is for a positive output 1305 from a transmitter and the bottom input terminal is for a negative output 1310 from a transmitter. When the positive and negative signals are coupled, via the transformer coupling 1315, it generates a coupled signal. When the coupled signal is received by a receiver 1320, it is converted or recovered as separate positive received signal and negative received signal.

Figure 13B:
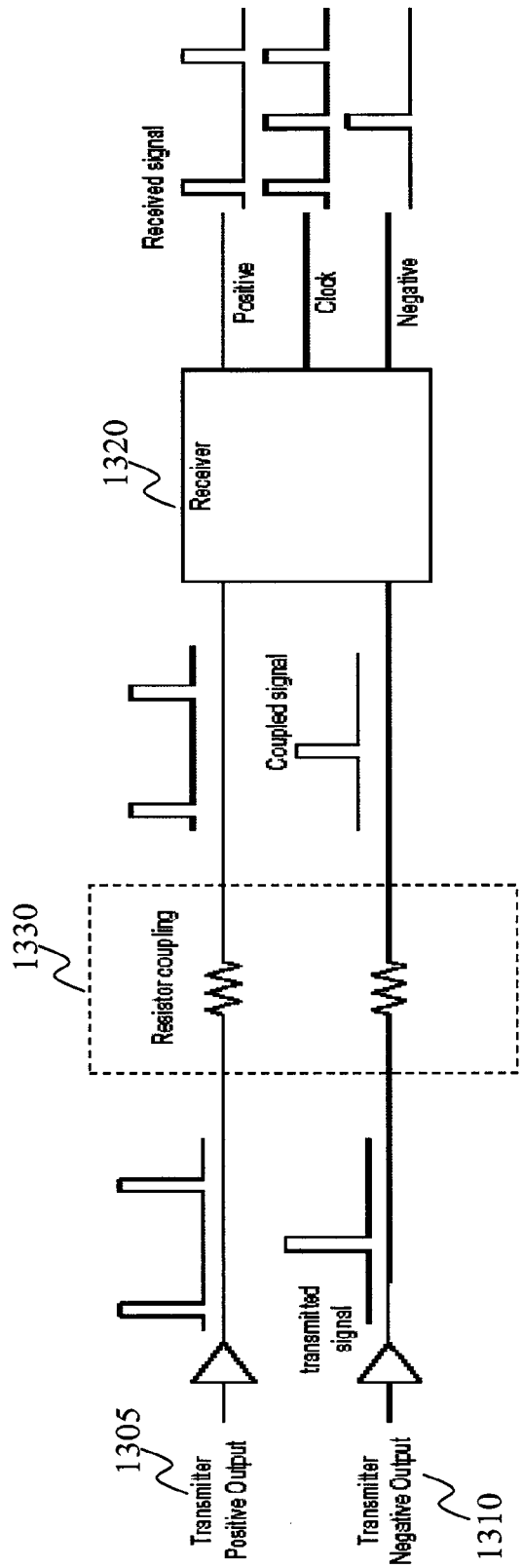
Figure 13C:
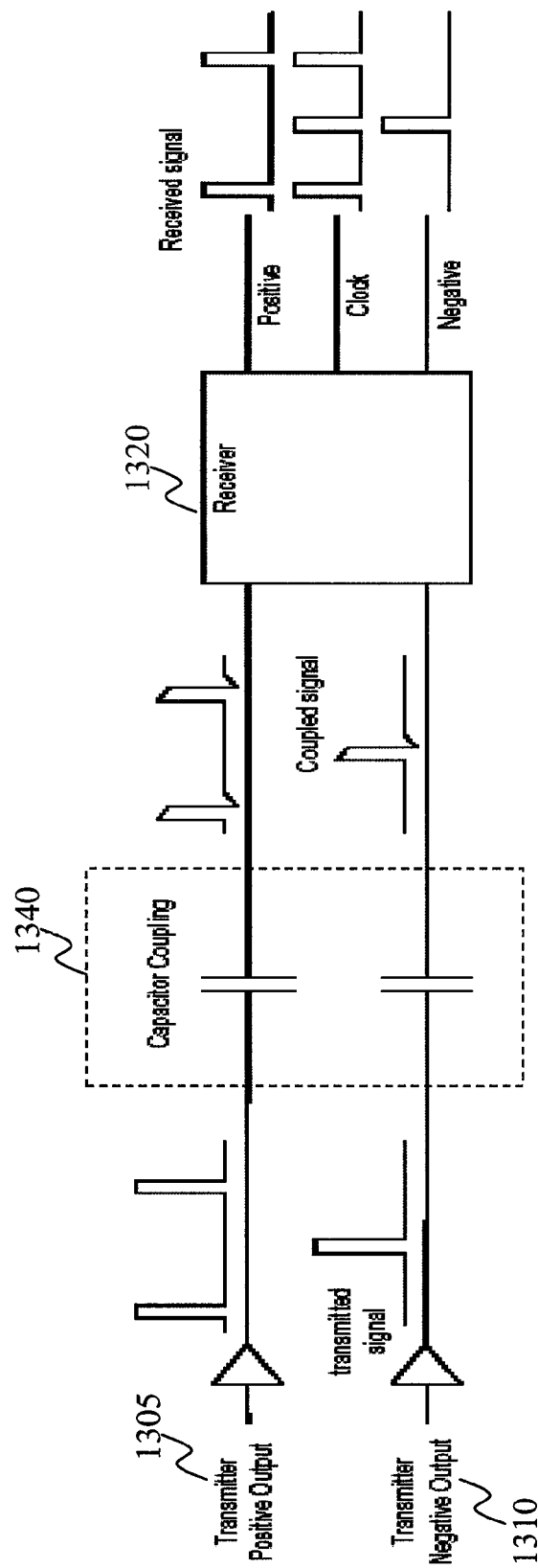
Figure 13D:
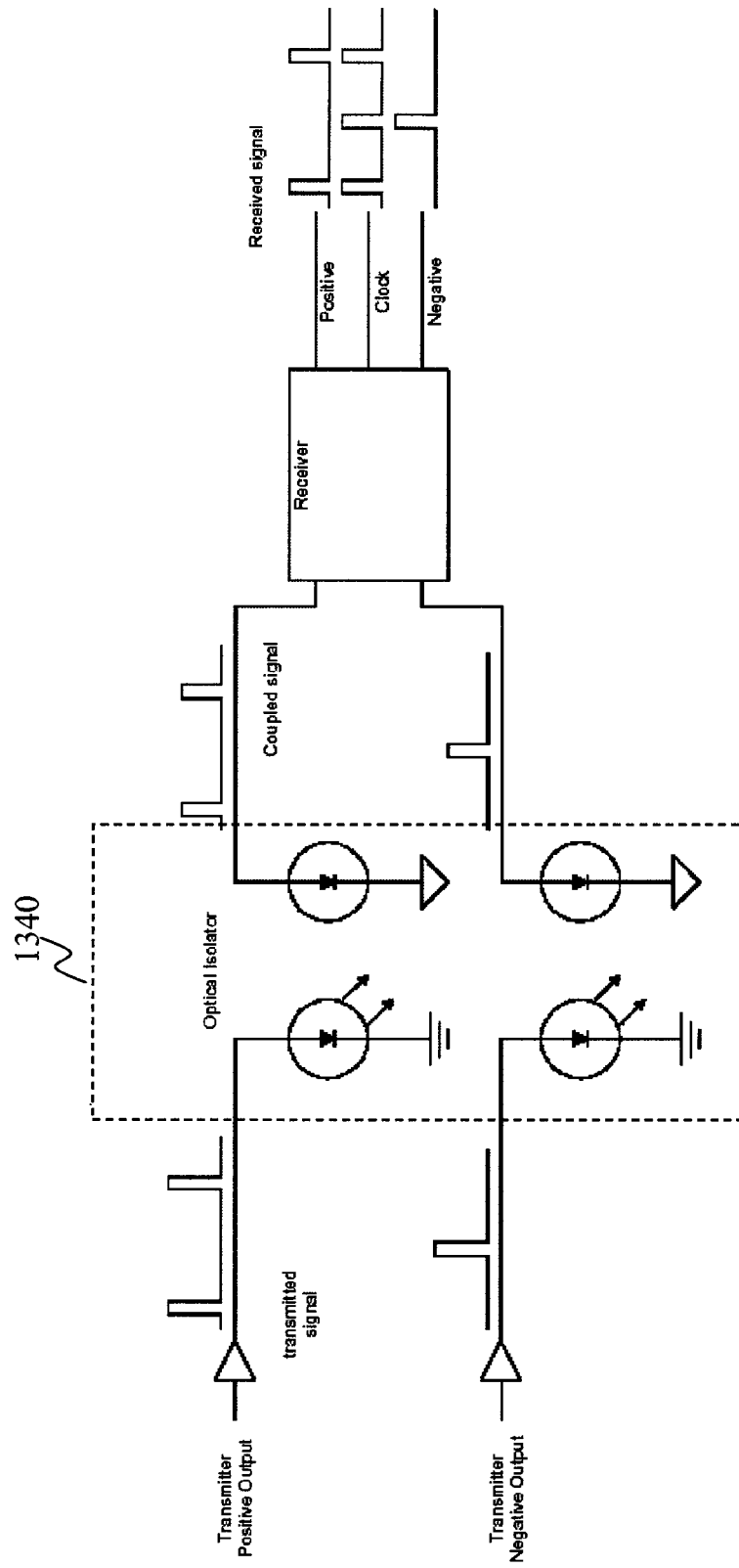

FIGS. 13(b)-13(d) depicts the implementations of an isolation component based on other known techniques. FIG. 13(b) illustrates an implementation based on a resistor coupling to generate a coupled signal. FIG. 13(c) illustrates an implementation based on a capacitor coupling to generate a coupled signal. FIG. 13(d) illustrates an implementation based on an optical isolator to generate a coupled signal.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and materials, such as are within the scope of the appended claims.

I claim:

1. A method for serially sending data signals from multiple sources through a single unidirectional isolation component, comprising the steps of:
   capturing, in parallel, the data signals from respective multiple sources;
   storing each of the captured data signals in a corresponding storage;
   transferring, in serial, the stored captured data signals in corresponding storage to the single unidirectional isolation component,
   performing two or more concurrent processes for parallel data signal capture and serial data signal transfer to the single unidirectional isolation component so that the sampling effect on a first of the processes is minimized, the first of the processes being initiated when a first input data signal is detected, and a second process being initiated when a second input data signal having a lower priority than the first input data signal is detected, and
   independently supplying first and second timing signals to handle the first and second processes, respectively,
   the first timing signal being activated when a change in the first input data signal is detected.

2. The method of claim 1, further comprising transmitting the serially transferred data signal in a serial manner via the single unidirectional isolation component.

3. The method of claim 2, wherein data signals captured by the first process and any other low priority process are ORed for transmitting to the single unidirectional isolation component.

4. The method of claim 2, wherein the single unidirectional isolated transmission of the serialized data signals includes timing information that facilitates recovery of the data signals.

5. The method of claim 1, wherein the step of capturing data signals in each process is initiated by a corresponding clock signal of that process.

6. The method of claim 1, wherein each of the timing signals is triggered by one of a detected event and a timed refresh signal.

7. The method of claim 6, wherein the event corresponds to an edge transition detected on the data signals associated with a corresponding process.

8. The method of claim 6, wherein a priority is assigned to each of the processes.

9. The method of claim 8, wherein the first of the processes has a high priority and remaining data processes have low priorities.

10. The method of claim 9, wherein the timed refresh signal has a low priority.

11. The method of claim 1, wherein the first process, once initiated upon a detection of an edge transition, pre-empts the capturing of data signals in other processes.

12. The method of claim 1, wherein the single unidirectional isolation component is implemented via at least one of
   transformer coupling;
   resistor coupling;
   capacitor coupling; and
   optical isolator.

13. The method of claim 1, wherein the first and remaining processes are processed concurrently.

14. The method of claim 1, further comprising:
   receiving the data signals transmitted by the single unidirectional isolation component and timing information;
   recovering data signals received based on the timing information; and
   maintaining a constant propagation delay in reconstructing the data signals.

15. The method of claim 14, further comprising de-serializing the data signals.

16. An apparatus for serially sending data signals from multiple sources through a single unidirectional isolation component, comprising:
- an input receiving apparatus coupled to the multiple sources for receiving a plurality of data signals, respectively;
- a plurality of storages configured for storing data signals from respective multiple sources;
- a control mechanism configured for enabling the plurality of storages to capture, in parallel, the data signals from the respective multiple sources;
- an unidirectional isolation component configured for isolating data signals prior to transmitting the data signals;
- a data transferring mechanism configured for transferring, in serial, the captured data signals, stored in the plurality of storages, to the unidirectional isolation component,
- a first circuit for handling a first process for parallel data signal capture and serial data signal transfer to the single unidirectional isolation component, the first process being initiated when a first input data signal is detected,
- a second circuit for handling a second process for parallel data signal capture and serial data signal transfer to the single unidirectional isolation component, the second process being initiated when a second input data signal having a lower priority than the first input data signal is detected, and
- first and second clocks for supplying first and second timing signals to handle the first and second processes, respectively,
- the first clock including a first event driven timer activated when a change in the first input data signal is detected.

17. The apparatus of claim 16, further comprising a transmitter coupled to the unidirectional isolation component for receiving serially transferred data signal and for transmitting the received data signal in a serial manner.

18. The apparatus of claim 17, wherein data signals captured by the first process and any other low priority process are ORed for transmitting to the single unidirectional isolation component.

19. The apparatus of claim 16, wherein the plurality of storages are implemented based on registers that are capable of shifting data signals stored therein.

20. The apparatus of claim 16, wherein the serial transferring mechanism is implemented based on one or more multiplexers.

21. The apparatus of claim 16, wherein the unidirectional isolation component is implemented via at least one of
- transformer coupling;
- resistor coupling;
- capacitor coupling; and
- optical isolator.

22. The apparatus of claim 16, wherein a priority is assigned to each of the processes.

23. The apparatus of claim 22, wherein the first of the processes has a high priority and remaining data processes have low priorities.

24. The apparatus of claim 16, wherein the first process, once initiated upon a detection of an edge transition, preempts the capturing of data signals in other processes.

25. The apparatus of claim 16, wherein the second clock includes a second event driven timer activated when a change in the second input data signal is detected.

26. An apparatus for serially sending data signals from multiple sources through a single unidirectional isolation component, comprising:
- an input receiving apparatus coupled to the multiple sources for receiving a plurality of data signals, respectively;
- a plurality of storages configured for storing data signals from respective multiple sources;
- a control mechanism configured for enabling the plurality of storages to capture, in parallel, the data signals from the respective multiple sources;
- an unidirectional isolation component configured for isolating data signals prior to transmitting the data signals; and
- a data transferring mechanism configured for transferring, in serial, the captured data signals, stored in the plurality of storages, to the unidirectional isolation component, wherein
- two or more concurrent processes for parallel data signal capture and serial data signal transfer to the single unidirectional isolation component are implemented in a manner so that a sampling effect on a first of the processes is minimized, wherein the control mechanism comprises:
- an event driven timer coupled to the plurality of storages for enabling the storages to capture the data signals upon being triggered;
- an event detector coupled to the multiple sources for detecting an event in the data signals to trigger the event driven timer; and
- a state machine coupled to the event detector for controlling capturing the data signals and subsequently serially transferring data signals stored in the storages to the unidirectional isolation component.

27. A method for serially sending data signals from multiple sources through a single unidirectional isolation component, comprising the steps of:
- capturing, in parallel, the data signals from respective multiple sources;
- storing each of the captured data signals in a corresponding storage;
- transferring, in serial, the stored captured data signals in corresponding storage to the single unidirectional isolation component,
- performing two or more concurrent processes for parallel data signal capture and serial data signal transfer to the single unidirectional isolation component so that systematic delay of data signals from a first of the processes due to delay effects of communicating a packet of multiple signals is minimized, the first of the processes being initiated when a first data signal is detected, and a second process being initiated when a second data signal having a lower priority than the first data signal is detected, and
- independently supplying first and second timing signals to handle the first and second processes, respectively,
- the first timing signal being activated when a change in the first data signal is detected.

28. The method of claim 27, wherein the step of capturing multiple data signals includes delaying the transmission of the captured multiple data signals based on the number of signals to be transmitted.

29. The method of claim 28, wherein the step of transferring multiple data signals in serial to the signal unidirectional isolation component creates a packet of data.

30. The method of claim 29, wherein the serial transfer of data signals is equal in length to the number of signals to be transmitted.

* * * * *